(12) United States Patent  (10) Patent No.: US 11,036,223 B2
Tsay  (45) Date of Patent: Jun. 15, 2021

(54) STEERING WHEEL WITH DRIVING MODE CONTROL

(71) Applicant: Honda Motor Co., Ltd., Tokyo (JP)

(72) Inventor: Michael M. Tsay, Irvine, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 250 days.

(21) Appl. No.: 16/270,988

(22) Filed: Feb. 8, 2019

(65) Prior Publication Data

US 2020/0257288 A1    Aug. 13, 2020

(51) Int. Cl.
| | |
|---|---|
| *G05D 1/00* | (2006.01) |
| *B62D 1/04* | (2006.01) |
| *B62D 1/10* | (2006.01) |
| *B62D 1/183* | (2006.01) |
| *B62D 1/184* | (2006.01) |
| *B60K 35/00* | (2006.01) |

(52) U.S. Cl.
CPC ........... *G05D 1/0061* (2013.01); *B60K 35/00* (2013.01); *B62D 1/046* (2013.01); *B62D 1/10* (2013.01); *B62D 1/183* (2013.01); *B62D 1/184* (2013.01); *B60K 2370/52* (2019.05)

(58) Field of Classification Search
CPC .. G05D 1/0061; B60K 35/00; B60K 2370/52; B62D 1/046; B62D 1/10; B62D 1/183; B62D 1/184
See application file for complete search history.

(56) References Cited

U.S. PATENT DOCUMENTS

| | | | |
|---|---|---|---|
| 8,994,521 | B2 | 3/2015 | Gazit |
| 9,274,525 | B1 | 3/2016 | Ferguson et al. |
| 9,550,500 | B2 | 1/2017 | Hackenburg et al. |
| 2015/0032334 | A1* | 1/2015 | Jang ...................... B60W 10/20 701/42 |
| 2016/0159386 | A1* | 6/2016 | Jang ......................... B62D 1/06 74/552 |
| 2016/0231855 | A1 | 8/2016 | Bendewald et al. |
| 2016/0244070 | A1 | 8/2016 | Bendewald et al. |
| 2016/0347347 | A1 | 12/2016 | Lubischer et al. |
| 2016/0362126 | A1 | 12/2016 | Lubischer et al. |
| 2016/0368522 | A1 | 12/2016 | Lubischer et al. |
| 2017/0113712 | A1 | 4/2017 | Watz et al. |
| 2018/0327028 | A1* | 11/2018 | Kamiyama ........... B60W 30/06 |
| 2019/0009676 | A1* | 1/2019 | Yokota .................. G06F 3/0484 |
| 2019/0308662 | A1* | 10/2019 | Christiansen ............ B62D 1/10 |
| 2019/0337566 | A1* | 11/2019 | Weidig ................... B62D 1/181 |

* cited by examiner

*Primary Examiner* — Calvin Cheung
(74) *Attorney, Agent, or Firm* — Rankin, Hill & Clark LLP

(57) ABSTRACT

According to one aspect, systems and techniques for driving mode control may include a steering wheel, a sensor, a display, and a controller. The steering wheel may have a button coupled thereto. The button may have a depressed state. When the button is in the depressed state, the steering wheel may be movable between a first position and a second position. The sensor may detect whether the steering wheel is in the first position or the second position. The display may display a display content. The controller may set the display content for the display or a driving mode of a vehicle, such as an autonomous driving mode or a manual driving mode, based on the detected position of the steering wheel.

18 Claims, 7 Drawing Sheets

STEERING WHEEL WITH DRIVING MODE CONTROL

BACKGROUND

Autonomous vehicles may be vehicles that do not require a human driver or any human input, and may be used to transport passengers or cargo from one location to another. An autonomous vehicle may operate in a fully autonomous mode where passengers may provide an initial input, such as a destination, and the vehicle maneuvers itself to that destination, steering around traffic, and/or obstacles.

BRIEF DESCRIPTION

According to one aspect, a system for driving mode control may include a steering wheel, a sensor, and a controller. The steering wheel may have a first button coupled thereto. In the depressed state of the button, the steering wheel may be movable between a first position and a second position. The sensor may detect whether the steering wheel is in the first position or the second position. The controller may set a driving mode of a vehicle based on the detected position of the steering wheel.

The driving mode may be an autonomous driving mode or a manual driving mode. The system for driving mode control may include a display displaying a current driving mode of the vehicle and a current position of the steering wheel. The first button may be positioned on a backside of the steering wheel, facing a forward driving direction of the vehicle.

The system for driving mode control may include a display displaying content and the controller may control the content displayed on the display based on the set driving mode. The controller may control the content displayed on the display to be meter content based on the set driving mode being a manual driving mode, and the meter content may include a current speed of the vehicle. The controller may control the content displayed on the display to be application content based on the set driving mode being an autonomous driving mode. The application content may include an infotainment application, a navigation application, a media application, a communication application, or a social media application.

The first position may be forward of the second position along a longitudinal direction of the vehicle. The first position may be vertically higher than the second position in a vertical direction of the vehicle. The steering wheel may have a second button coupled thereto, the second button may have a depressed state, and when the first button and the second button are both in the depressed state, the steering wheel may be movable between the first position and the second position. When one of the first button or the second button is not depressed, the steering wheel may be locked into the first position or the second position.

The steering wheel may be adjustable along a longitudinal axis of the vehicle between the first position and the second position. The steering wheel may be rotatable about a pivot point along a transverse axis of the vehicle. The pivot point may be positioned on an end portion of the steering wheel opposite a steering portion of the steering wheel in a longitudinal direction of the vehicle. The first button or the second button may be paddle buttons.

According to one aspect, a system for driving mode control may include a steering wheel, a sensor, a display, and a controller. The steering wheel may have a button coupled thereto. The button may have a depressed state, where in the depressed state the steering wheel may be movable between a first position and a second position. The sensor may detect whether the steering wheel is in the first position or the second position. The display may display a display content. The controller may set the display content for the display based on the detected position of the steering wheel.

The button may be a paddle button. The display content may include a current position of the steering wheel. The button may be positioned on a backside of the steering wheel, facing a forward driving direction of a vehicle. The controller may set a driving mode of a vehicle based on the detected position of the steering wheel.

According to one aspect, a system for driving mode control may include a steering wheel, a sensor, a display, and a controller. The steering wheel may have a button coupled thereto. The button may have a depressed state. When the button is in the depressed state the steering wheel may be movable between a first position and a second position. The sensor may detect whether the steering wheel is in the first position or the second position. The display may display a display content. The controller may set the display content for the display or a driving mode of a vehicle based on the detected position of the steering wheel.

DETAILED DESCRIPTION

Figure 1:
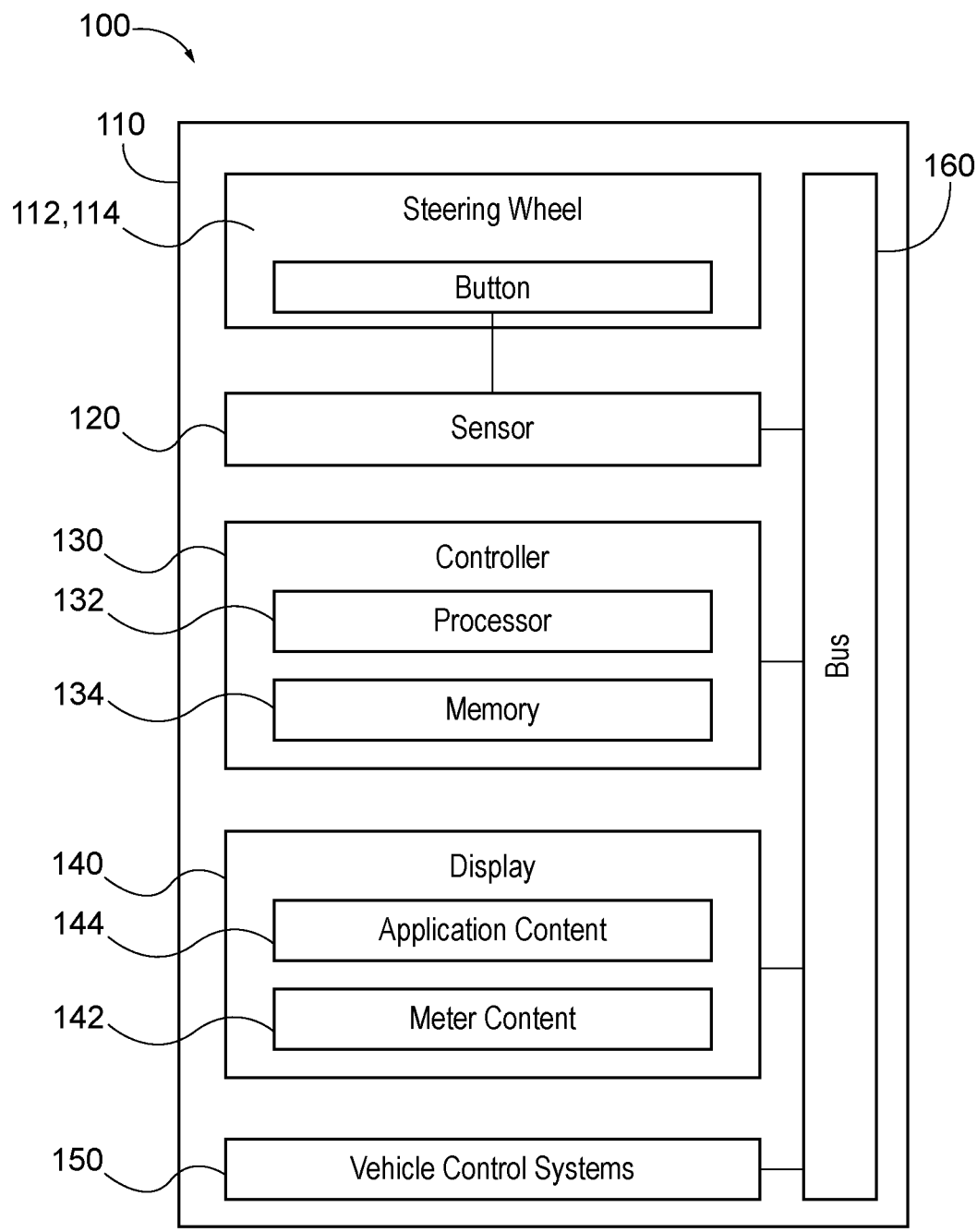
FIG. 1 is an exemplary block diagram of a system for driving mode control, according to one aspect.

The following terms are used throughout the disclosure, the definitions of which are provided herein to assist in understanding one or more aspects of the disclosure.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

An "operable connection", or a connection by which entities are "operably connected", is one in which signals, physical communications, and/or logical communications may be sent and/or received. An operable connection may include a wireless interface, a physical interface, a data interface, and/or an electrical interface. In this regard, one or more of the components of FIG. 1 of the system for driving mode control may be operably connected and may communicate with one another via computer communication.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system" or "vehicle control system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary block diagram of a system 100 for driving mode control, according to one embodiment. The system 100 for driving mode control may enable a user or a driver of a vehicle, such as an autonomous vehicle to change or switch driving modes, quickly or on the fly. In other words, the system 100 for driving mode control may enable the driver of the vehicle to change the operation mode of the vehicle from a first mode to a second mode, such as from an autonomous driving mode to a manual driving mode or from a first display mode to a second display mode.

In this regard, the system 100 for driving mode control may include a steering wheel 110 having a first button 112 and/or a second button 114 (shown in FIGS. 2-3) attached or coupled thereto. These buttons (the first button 112 and the second button 114) may each have a depressed state and a non-depressed state or an active state and a non-active state. According to one aspect where there is merely the first button 112, when the first button 112 is in its depressed state, a body of the steering wheel 110 may be adjustable from a first position to a second position. Examples of the first position and the second position may be seen from FIGS. 2-7, as will be described in greater detail herein. The buttons 112, 114 may be replaced with switches or levers according to other aspects. The buttons 112, 114 may be paddle buttons.

The system 100 for driving mode control may include a sensor 120 which detects a position of the steering wheel 110. The sensor 120 may detect whether the steering wheel 110 or the body of the steering wheel 110 is in the first position or is in the second position.

Based on the detected position of the body of the steering wheel 110 (i.e., as the first position or the second position) by the sensor 120, a controller 130 of the system 100 for driving mode control may set a mode of operation for the vehicle. The controller 130 may include a processor 132 and a memory 134, which may store one or more instructions or a set of instructions for the processor to execute. According to one aspect, the processor 132 or the controller 130 may set the mode associated with the vehicle to be a first mode when the steering wheel 110 is detected to be in the first position and a second mode when the steering wheel 110 is detected to be in the second position. In this way, the system 100 for driving mode control may enable different driving modes to be engaged when the driver of the vehicle pushes, pulls, or rotates the steering wheel 110 between the first position and the second position.

According to one aspect, the system 100 for driving mode control may change a display mode for a display 140 of the vehicle based on the mode of the vehicle set according to the detected steering wheel position. The display 140 may be a display screen or a touchscreen, and may be part of an infotainment system or a center console display, a heads up display, etc. For example, the controller 130 may set the mode associated with the vehicle to be a first display mode when the steering wheel 110 is detected to be in the first position and in a second display mode when the steering wheel 110 is detected to be in the second position. Examples of these display modes may be seen in greater detail in FIGS. 6-7.

In the first display mode, meter content 142 may be displayed. In the second display mode, application content 144 may be displayed. According to one aspect, both the application content 144 and the meter content 142 may be displayed in the first display mode and the second display mode, but a size of the application content 144 or a size of the meter content 142 may be adjusted depending on the mode. In other words, according to this aspect, in the first display mode, the size of (e.g., area occupied on the display 140) the meter content 142 may be greater than the size of the application content 144. Conversely, in the second display mode, the size of or the area occupied by the meter content 142 may be less than the size of or the area occupied by the application content 144. In this way, the system 100 for driving mode control may set, using the controller 130, content on the display 140 according to the detected position of the steering wheel 110. Stated another way, the controller 130 may change the display 140 in response to the retracting of the steering wheel 110 from one position to another and remove the meter content 142 or remove the application content 144 based on the detected position of the steering wheel 110.

The display 140 of the system 100 for driving mode control may display, in addition to display content such as the meter content 142 and/or the application content 144, a current driving mode of the vehicle and a current position of the steering wheel 110 (i.e., the first position or the second position) or other status information briefly after a position change for the steering wheel 110 occurs. The display 140 may display content, including application content 144 or meter content 142, as controlled by the controller 130 which sets the content to be displayed on the display 140 based on the set driving mode.

According to one aspect, the autonomous driving mode may include the second display mode. In other words, the change of the steering wheel 110 to the position associated with the autonomous driving mode may also be associated with the change in the display mode to display the application content 144 or for the application content 144 to occupy a larger portion of the display area than the meter content 142. Conversely, the manual driving mode may include the first display mode. For example, the change of the steering wheel 110 to the position associated with the manual driving mode may also be associated with the change in the display mode to display the meter content 142 or for the meter content 142 to occupy a larger portion of the display area than the application content 144.

The processor 132 or the controller 130 may control or manage these aspects related to the type of content displayed and/or the size or amount of area occupied on the display 140. Further, the controller 130 may manage the size or amount of area occupied based on a current velocity of the vehicle and/or based on a distance to a next turn or lane change maneuver, or a distance to the desired destination.

As previously discussed, one of the modes (e.g., the first mode or the second mode) may be the autonomous driving mode and the other mode may be the manual driving mode. In the autonomous driving mode, the vehicle may drive itself, or otherwise operate autonomously. For example, the processor 132 or the controller 130 may command one or more vehicle control systems 150 to act without human input. Conversely, in the manual mode, the driver may operate the vehicle in a manual fashion.

Stated another way, the controller 130 may operate, based on the mode of the vehicle set according to the steering wheel position, one or more vehicle control systems 150, such as an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems, a display), a climate control system, an electronic pretensioning system, a monitoring system, a passenger detection system, a vehicle suspension system, a vehicle seat configuration system, a vehicle cabin lighting system, an audio system, an infotainment system, or a sensory system based on artificial intelligence, a desired destination, sensor inputs, data received from a controller area network (CAN) bus 160, data received from a global positioning system (GPS), data received from a receiver, etc.

In this way, the vehicle, when operating in the autonomous mode, may automatically steer itself from a current location to the desired destination, using data received from other sensors, and the GPS to navigate around traffic, obstacles, or other roadway scenarios, based on the position of the steering wheel 110.

Figure 2:
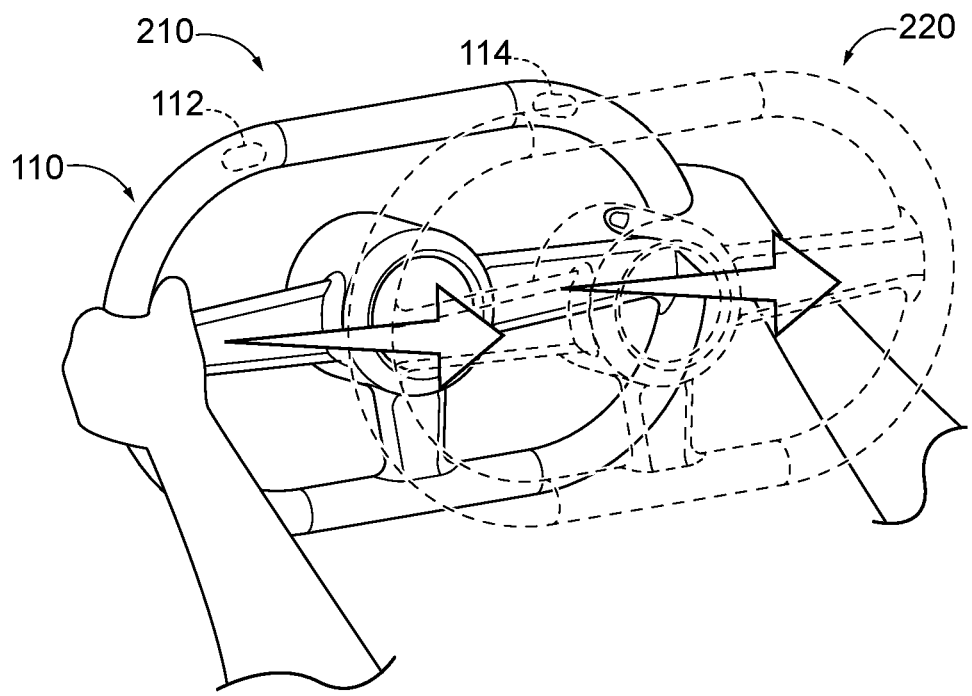
FIG. 2 is a perspective view of the system for driving mode control, according to one aspect.
Figure 3:
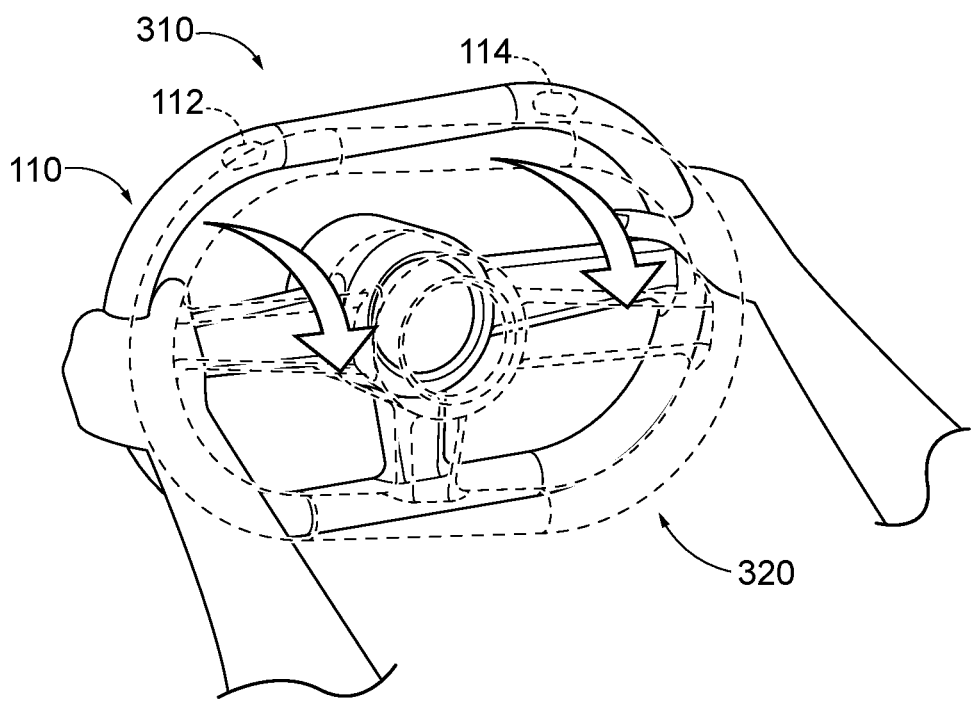
FIG. 3 is a perspective view of the system for driving mode control, according to one aspect.

FIG. 2 is a perspective view of the system 100 for driving mode control, according to one aspect. FIG. 3 is a perspective view of the system 100 for driving mode control, according to one aspect. The steering wheel 110 may include the first button 112 and the second button 114 coupled thereto. Each button 112, 114 may include a depressed state, a non-depressed state or an actuated state and a non-actuated state. When the first button 112 and the second button 114 are both in the depressed state, the steering wheel 110 may be movable between the first position and the second position. In FIG. 2, the steering wheel 110 may be slidable between the first position 210 and the second position 220 (shown in phantom), such as adjustable along a longitudinal axis of the vehicle.

Figure 5:
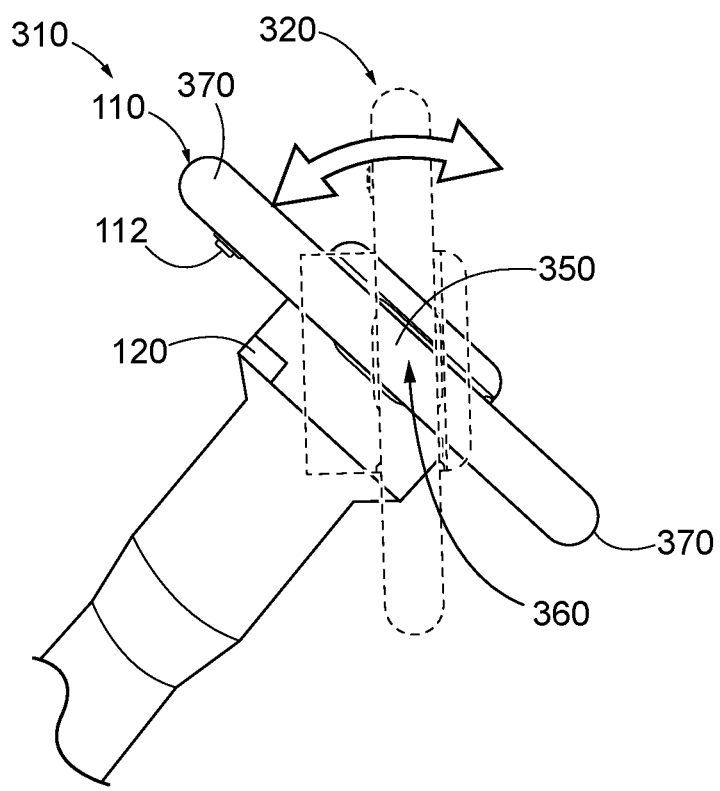
FIG. 5 is a side view of the system for driving mode control, according to one aspect.

In FIGS. 3 and 5, according to another aspect, the steering wheel 110 may be rotatable between the first position 310 and the second position 320, such as rotatable about a pivot point 350 along a transverse axis of the vehicle. The pivot point may be positioned on a center portion 360 of the steering wheel 110 central to a steering portion 370 of the steering wheel 110. Additionally, both buttons 112, 114 may be depressed for the adjustment of the position of the steering wheel 110 to occur. For example, when one of the first button 112 or the second button 114 is not depressed, the steering wheel 110 may be locked into the first position 310, the second position 320, or a current position between the two positions.

Figure 4:
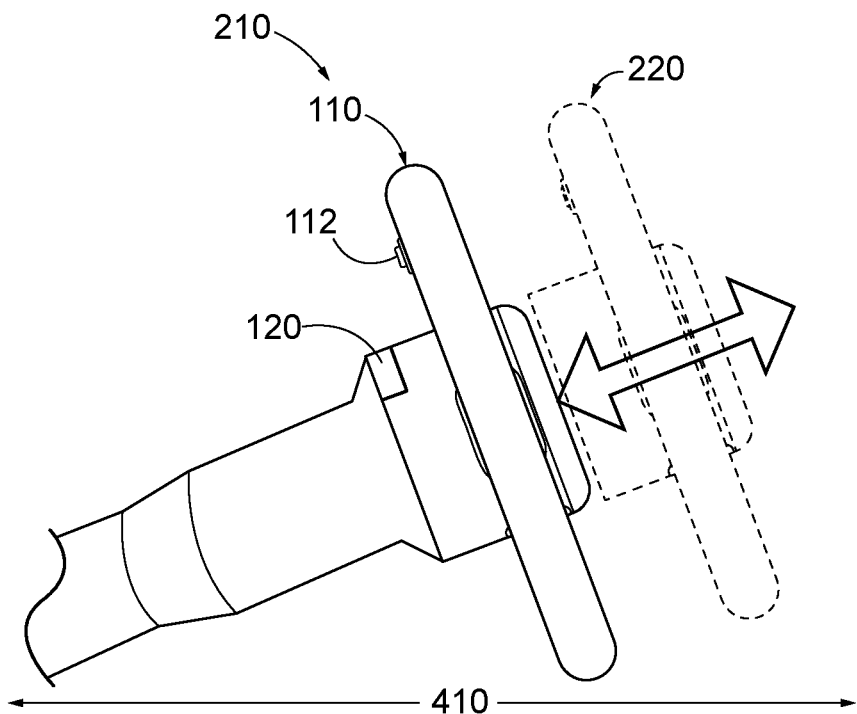
FIG. 4 is a side view of the system for driving mode control, according to one aspect.

FIG. 4 is a side view of the system 100 for driving mode control, according to one aspect. FIG. 5 is a side view of the system 100 for driving mode control, according to one aspect. As seen in FIGS. 4-5, the button, which may be the first button 112, is positioned on a backside of the steering wheel 110, facing a forward driving direction of the vehicle. Also in FIG. 4, the first position 210 may be forward of the second position 220 along a longitudinal direction 410 of the vehicle. In the aspect depicted by FIG. 5, the first position may be vertically higher (or lower) than the second position in a vertical direction of the vehicle. For example, the button 112 at the first position 310 is vertically lower than the button 112 at the second position 320. In FIG. 5, the button 112 may be depressed to enable adjustment of the steering wheel 110 to rotate the steering wheel 110 about an axis which is transverse of the vehicle or a transverse axis of the vehicle.

Figure 6:
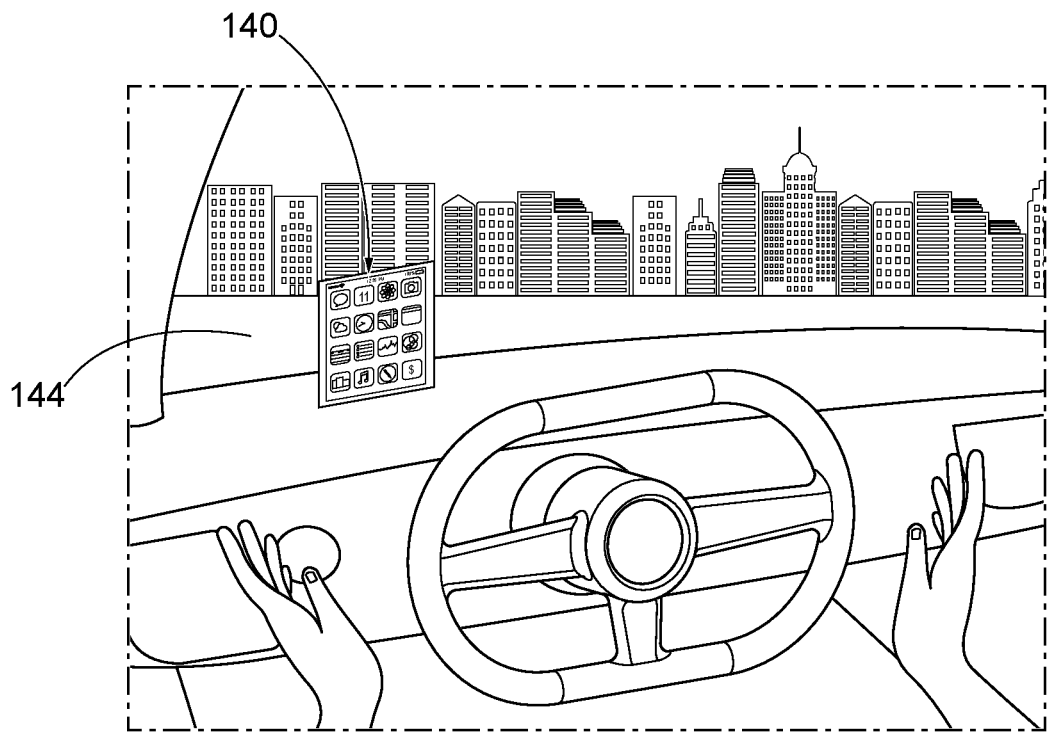
FIG. 6 is an exemplary implementation of the system for driving mode control, according to one aspect.
Figure 7:
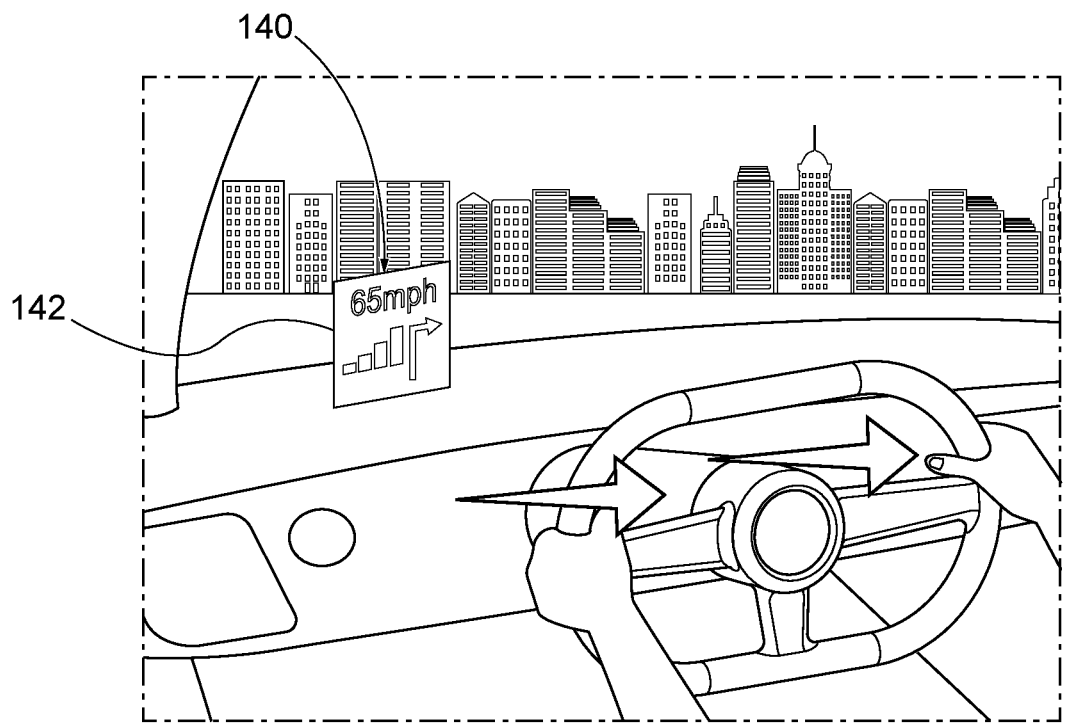
FIG. 7 is an exemplary implementation of the system for driving mode control, according to one aspect.

FIG. 6 is an exemplary implementation of the system 100 for driving mode control, according to one aspect. FIG. 7 is an exemplary implementation of the system 100 for driving mode control, according to one aspect.

As seen in FIG. 6, the controller 130 may control the content displayed on the display 140 to be application content 144 based on the set driving mode being an autonomous driving mode. The application content 144 may include different types of applications, media, infotainment, etc. For example, the application content 144 may include an infotainment application, a navigation application, a media application, a communication application, or a social media application.

As seen in FIG. 7, the controller 130 may control the content displayed on the display 140 to be meter content 142 based on the set driving mode being the manual driving mode. The meter content 142 may include a current speed of the vehicle, tachometer information, speedometer information, fuel and temperature information, etc. associated with the vehicle.

With reference to the steering wheel 110 of FIG. 7, when the button(s) 112, 114 is/are depressed and the steering wheel 110 is pushed in the forward direction, the vehicle may be placed in the autonomous drive mode, as seen in FIG. 6. Stated another way, when the buttons 112, 114 or paddle buttons are pressed in combination with pushing the steering wheel 110 outward, away from the driver in a forward driving direction of the vehicle, this causes the autonomous drive mode to be engaged. Conversely, when the buttons 112, 114 or paddle buttons are pressed in combination with pulling the steering wheel 110 inward to a center of the vehicle, or toward the driver, this causes the manual drive mode to be engaged.

Figure 8:
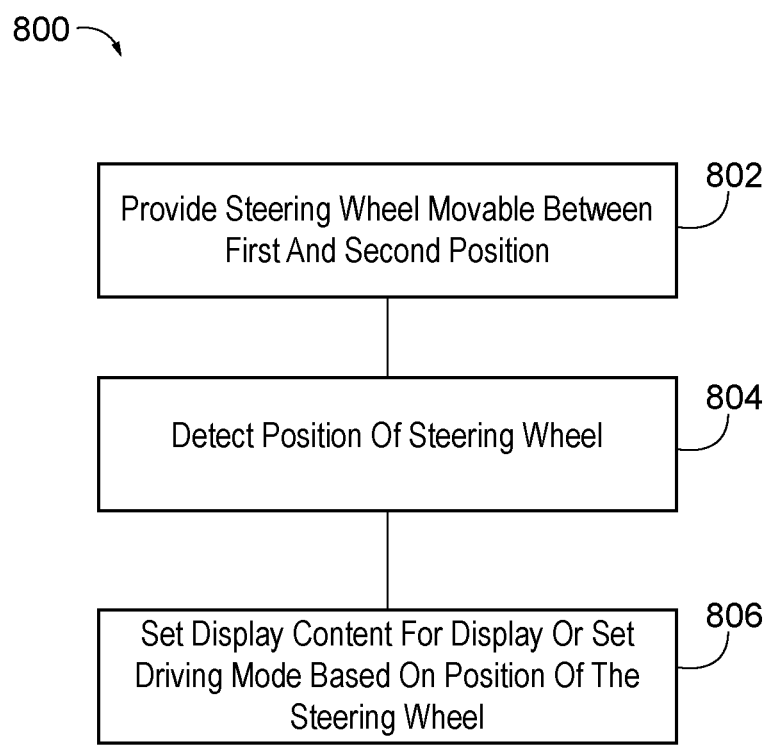
FIG. 8 is an exemplary flow diagram of a method for driving mode control, according to one aspect.

FIG. 8 is an exemplary flow diagram of a method 800 for driving mode control, according to one aspect. The method 800 may include providing 802 a steering wheel 110 movable or adjustable between a first position and a second position. The method 800 may include detecting 804 a position of the steering wheel 110. Based on the detected position of the steering wheel 110, the display content may be set 806 or the driving mode may be set based on the detected position of the steering wheel 110.

Figure 9:
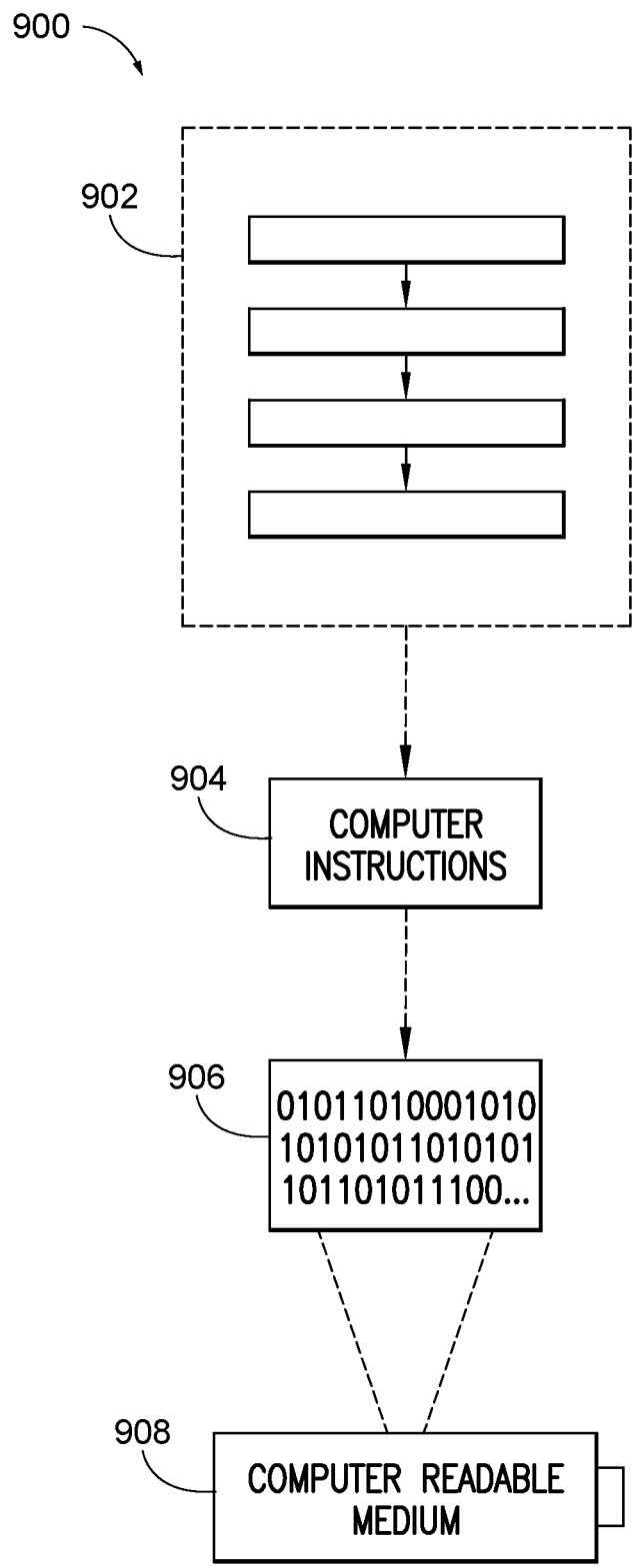
FIG. 9 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 9, wherein an implementation 900 includes a computer-readable medium 908, such as a CD-R, DVD-R, flash drive, a platter of a hard disk drive, etc., on which is encoded computer-readable data 906. This encoded computer-readable data 906, such as binary data including a plurality of zero's and one's as shown in 906, in turn includes a set of processor-executable computer instructions 904 configured to operate according to one or more of the principles set forth herein. In this implementation 900, the processor-executable computer instructions 904 may be configured to perform a method 902, such as the method 800 of FIG. 8. In another aspect, the processor-executable computer instructions 904 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
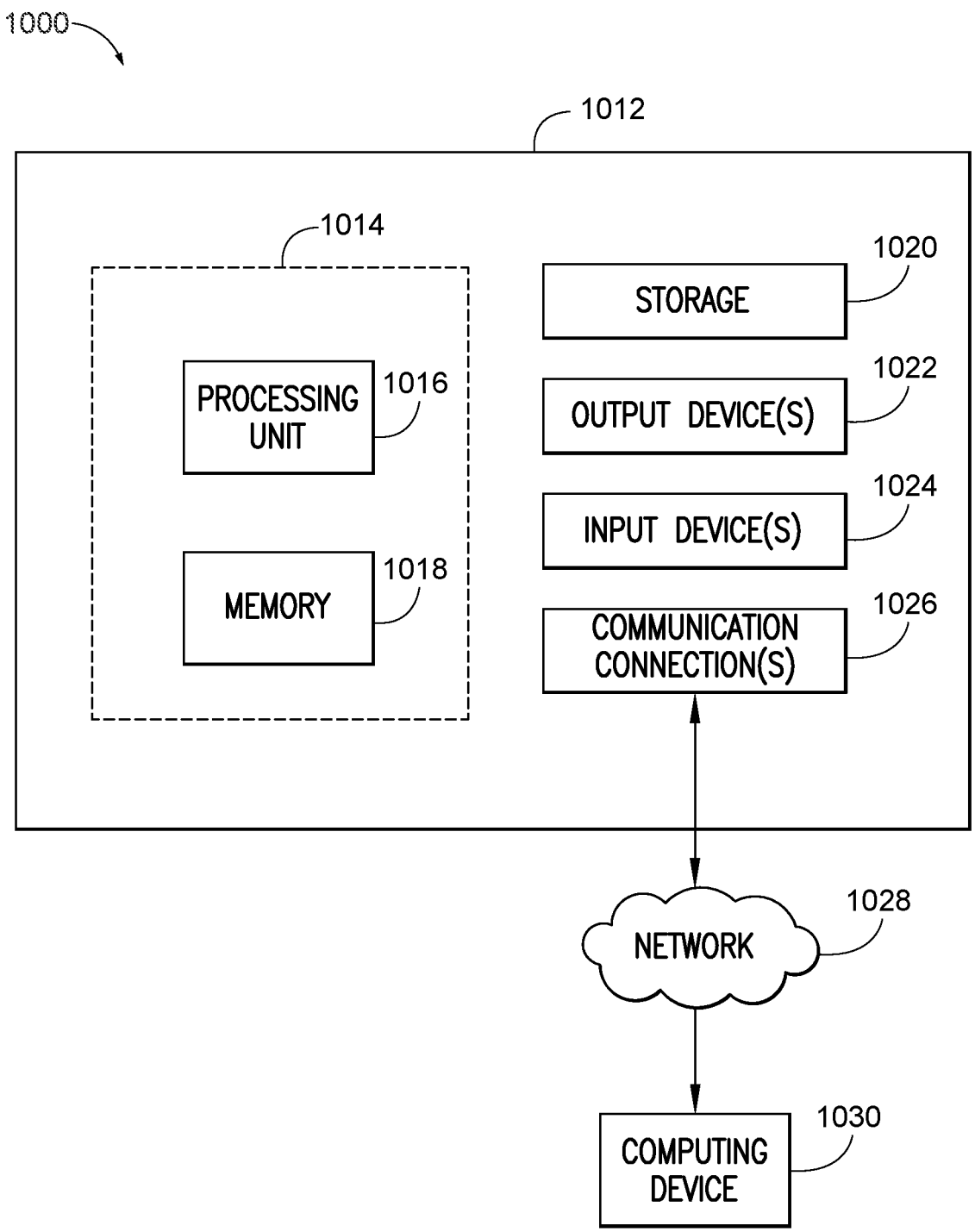
FIG. 10 is an illustration of an example computing environment where one or more of the provisions set forth herein are implemented, according to one aspect.

FIG. 10 and the following discussion provide a description of a suitable computing environment to implement aspects of one or more of the provisions set forth herein. The operating environment of FIG. 10 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 10 illustrates a system 1000 including a computing device 1012 configured to implement one aspect provided herein. In one configuration, the computing device 1012 includes at least one processing unit 1016 and memory 1019. Depending on the exact configuration and type of computing device, memory 1018 may be volatile, such as RAM, non-volatile, such as ROM, flash memory, etc., or a combination of the two. This configuration is illustrated in FIG. 10 by dashed line 1014.

In other aspects, the computing device 1012 includes additional features or functionality. For example, the computing device 1012 may include additional storage such as removable storage or non-removable storage, including, but not limited to, magnetic storage, optical storage, etc. Such additional storage is illustrated in FIG. 10 by storage 1020. In one aspect, computer readable instructions to implement one aspect provided herein are in storage 1020. Storage 1020 may store other computer readable instructions to implement an operating system, an application program, etc. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 1012. Any such computer storage media is part of the computing device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 1012 includes input device(s) 1024 such as keyboard, mouse, pen, voice input device, touch input device, infrared cameras, video input devices, or any other input device. Output device(s) 1022 such as one or more displays, speakers, printers, or any other output device may be included with the computing device 1012. Input device(s) 1024 and output device(s) 1022 may be connected to the computing device 1012 via a wired connection, wireless connection, or any combination thereof. In one aspect, an input device or an output device from another computing device may be used as input device(s) 1024 or output device(s) 1022 for the computing device 1012. The computing device 1012 may include communication connection(s) 1026 to facilitate communications with one or more other devices 1030, such as through network 1028, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for driving mode control, comprising:
a steering wheel with a first button coupled thereto, the first button having a depressed state, where in the depressed state the steering wheel is movable between a first position and a second position;
a sensor detecting whether the steering wheel is in the first position or the second position; and
a controller setting a driving mode of a vehicle based on the detected position of the steering wheel,
wherein the first button is positioned on a backside of the steering wheel, facing a forward driving direction of the vehicle.

2. The system for driving mode control of claim 1, wherein the driving mode is an autonomous driving mode or a manual driving mode.

3. The system for driving mode control of claim 1, comprising a display displaying a current driving mode of the vehicle and a current position of the steering wheel.

4. The system for driving mode control of claim 1, comprising a display displaying content, wherein the controller controls the content displayed on the display based on the set driving mode.

5. The system for driving mode control of claim 4, wherein the controller controls the content displayed on the display to be meter content based on the set driving mode being a manual driving mode, the meter content including a current speed of the vehicle.

6. The system for driving mode control of claim 4, wherein the controller controls the content displayed on the display to be application content based on the set driving mode being an autonomous driving mode, wherein the application content includes an infotainment application, a navigation application, a media application, a communication application, or a social media application.

7. The system for driving mode control of claim 1, wherein the first position is forward of the second position along a longitudinal direction of the vehicle.

8. The system for driving mode control of claim 1, wherein the first position is vertically higher than the second position in a vertical direction of the vehicle.

9. The system for driving mode control of claim 1, wherein the steering wheel has a second button coupled thereto, the second button having a depressed state, and when the first button and the second button are both in the depressed state, the steering wheel is movable between the first position and the second position.

10. The system for driving mode control of claim 9, wherein when one of the first button or the second button is not depressed, the steering wheel is locked into the first position or the second position.

11. The system for driving mode control of claim 1, wherein the steering wheel is adjustable along a longitudinal axis of the vehicle between the first position and the second position.

12. The system for driving mode control of claim 1, wherein the steering wheel is rotatable about a pivot point along a transverse axis of the vehicle, wherein the pivot point is positioned on an end portion of the steering wheel opposite a steering portion of the steering wheel in a longitudinal direction of the vehicle.

13. The system for driving mode control of claim 1, wherein the first button is a paddle button.

14. A system for driving mode control, comprising:
a steering wheel with a button coupled thereto, the button having a depressed state, where in the depressed state the steering wheel is movable between a first position and a second position;
a sensor detecting whether the steering wheel is in the first position or the second position;
a display displaying display content; and
a controller setting the display content for the display based on the detected position of the steering wheel, wherein the controller sets a driving mode of a vehicle based on the detected position of the steering wheel.

15. The system for driving mode control of claim 14, wherein the button is a paddle button.

16. The system for driving mode control of claim 14, wherein the display content includes a current position of the steering wheel.

17. The system for driving mode control of claim 14, wherein the button is positioned on a backside of the steering wheel, facing a forward driving direction of a vehicle.

18. A system for driving mode control, comprising:
a steering wheel with a button coupled thereto, the button having a depressed state, where in the depressed state the steering wheel is movable between a first position and a second position;
a sensor detecting whether the steering wheel is in the first position or the second position;
a display displaying display content, a current driving mode of the vehicle, and a current position of the steering wheel; and
a controller setting the display content for the display or a driving mode of a vehicle based on the detected position of the steering wheel.

* * * * *